(12) United States Patent
Samp

(10) Patent No.: US 6,748,665 B1
(45) Date of Patent: Jun. 15, 2004

(54) ILLUMINATED SPIRIT LEVEL

(76) Inventor: Ronny Lee Samp, 18302 Avon Ave., Port Charlotte, FL (US) 33948

( * ) Notice: Subject to any disclaimer, the term of this patent is extended or adjusted under 35 U.S.C. 154(b) by 0 days.

(21) Appl. No.: 10/234,934

(22) Filed: Sep. 4, 2002

(51) Int. Cl.[7] ................................................. G01C 9/32
(52) U.S. Cl. ........................ 33/348.2; 33/382; 33/371
(58) Field of Search ............................... 33/348, 348.2, 33/382, 383, 384, 370, 371

(56) References Cited

U.S. PATENT DOCUMENTS

| | | | | | |
|---|---|---|---|---|---|
| 613,946 | A | * | 11/1898 | Starrett | 33/382 |
| 2,205,733 | A | * | 6/1940 | Sauter et al. | 33/348.2 |
| 2,305,678 | A | * | 12/1942 | Cravaritis et al. | 33/348 |
| 2,367,858 | A | * | 1/1945 | Flynn | 33/348.2 |
| 2,481,736 | A | * | 9/1949 | Foerster | 33/348.2 |
| 2,689,412 | A | * | 9/1954 | Young | 33/371 |
| 2,901,836 | A | * | 9/1959 | Hall | 33/373 |
| 2,944,144 | A | * | 7/1960 | Naylor | 33/348.2 |
| 3,003,054 | A | * | 10/1961 | Hubbard | 33/348.2 |
| 3,046,672 | A | * | 7/1962 | Lace | 33/348 |
| 3,146,529 | A | * | 9/1964 | Chamberlain | 33/370 |
| 3,166,855 | A | * | 1/1965 | Erritt | 33/348 |
| 3,172,212 | A | * | 3/1965 | Pappas | 33/382 |

* cited by examiner

*Primary Examiner*—G. Bradley Bennett

(57) ABSTRACT

This invention describes an illuminated spirit level that can be used in an aircraft to determine aircraft attitude as well as aircraft direction. The invention essentially comprises three levels arranged in the shape of a cross with bubble vials in each of the left and right "wings" and a bubble vial in the forward section of the central level. The levels would have a battery-operated power source to keep the device illuminated in the event that the electrical controls of the plane malfunction. Additionally, the bubble vials would contain a glow-in-the-dark fluid in case of battery failure. The spirit level could be secured to the top of the dash or alternatively, could be mounted within the instrument control panel.

19 Claims, 1 Drawing Sheet

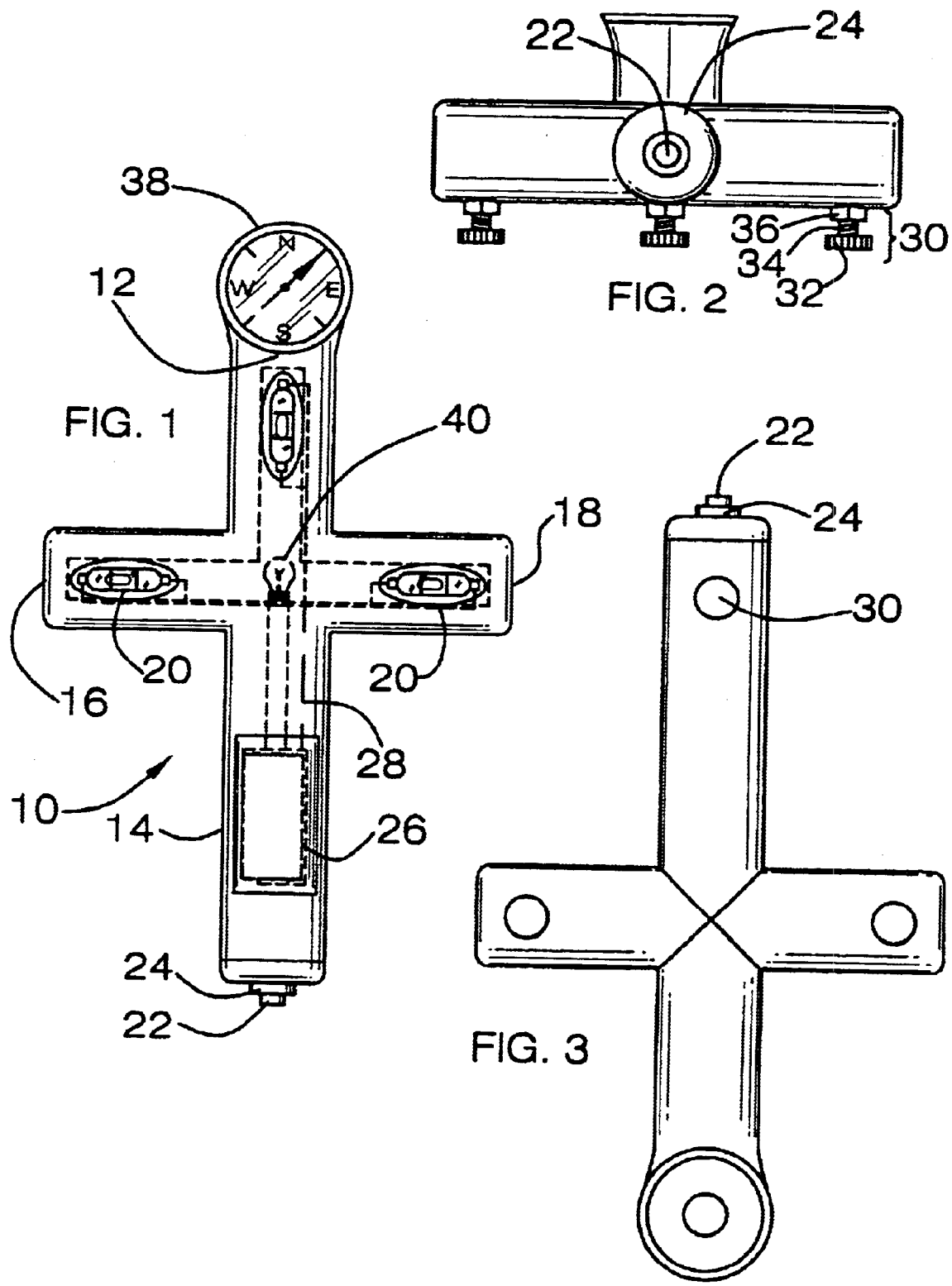

ILLUMINATED SPIRIT LEVEL

BACKGROUND OF THE INVENTION

1. Field of the Invention

The present invention relates to an illuminated spirit level for use in connection with determining the attitude of an aircraft. The illuminated spirit level has particular utility in connection with determining aircraft attitude in the event that there is a primary failure of the aircraft's electrically powered flight instruments.

2. Description of the Prior Art

Spirit levels are desirable to determine whether or not something is horizontally disposed. The most common form of level is that which is straight, relatively narrow, and elongated. The present invention describes a level that is in the shape of an airplane.

The use of a level is known in the prior art. For example, U.S. Pat. No. 2,752,692 to Smith discloses a level with a pair of movable arms attached the Smith '692 patent is not battery operated, nor does it have glow-in-the-dark liquid inside the capsules in case of a power outage. This patent has the further drawbacks of being unable to be used to determine airplane attitude and being unable to be fastened to the dashboard of the airplane.

U.S. Pat. No. 3,146,529 to Chamberlain discloses a leveling indicator that illustrates whether or not an object is horizontally disposed. However, the Chamberlain '529 patent is not able to measure airplane attitude, and additionally cannot be used in the dark since it is not battery operated nor does it have glow-in-the-dark liquid in the capsules.

Similarly, U.S. Pat. No. 5,075,978 to Crowe discloses a spirit level that has a dual battery configuration that illuminates the bubble tubes. However, the Crowe '978 patent does not contain glow-in-the-dark liquid in case the battery fails, and can not measure attitude.

U.S. Pat. No. 5,020,232 to Whiteford discloses an illuminated level in which each bubble vial is illuminated by an individual light emitting diode (LED) energized from a battery supported within the body of the level. However, the Whiteford '232 patent cannot measure attitude and does not contain glow-in-the-dark fluid within the bubble vials in case the battery fails.

Lastly, U.S. Pat. No. 4,407,075 to MacDernott discloses a spirit level that is illuminated at both ends. However, the MacDermott '075 patent does not measure attitude, and has the additional deficiency of being unable to be fastened to the dashboard of an airplane.

While the above-described devices fulfill their respective, particular objectives and requirements, the aforementioned patents do not describe a spirit level that can be attached to an airplane dashboard and be used to measure airplane attitude. The present invention can be battery operated for illumination and thus is capable of being used even when the electrical instruments in the plane malfunction. Additionally, the bubble vials of the present invention contain a fluid that glows in the dark so that they can be seen if the battery fails. None of the above inventions illustrates all of the above features in one invention.

Therefore, a need exists for a new and improved illuminated spirit level that can be used for determining airplane attitude. In this regard, the present invention substantially fulfills this need. In this respect, the spirit level according to the present invention substantially departs from the conventional concepts and designs of the prior art, and in doing so provides an apparatus primarily developed for the purpose of determining airplane attitude when the electrical system in the plane malfunctions.

SUMMARY OF THE INVENTION

In view of the foregoing disadvantages inherent in the known types of leveling gauges now present in the prior art, the present invention provides an improved illuminated spirit level, and overcomes the above-mentioned disadvantages and drawbacks of the prior art. As such, the general purpose of the present invention, which will be described subsequently in greater detail, is to provide a new and improved illuminated spirit level which has all the advantages of the prior art mentioned heretofore and many novel features that result in an illuminated spirit level which is not anticipated, rendered obvious, suggested, or even implied by the prior art, either alone or in any combination thereof.

To attain this, the present invention essentially comprises three bubble vial levels mounted onto a cross-shaped casing that is intended to represent an aircraft fuselage and its wings. One bubble vial would be placed in each left and right "wing" and a third bubble vial would be placed at the top forward portion of the cross representing the aircraft cockpit. Each bubble vial could be filled with a luminescent fluid to glow in the dark and be visible in the event of a primary electrical system failure. Additionally, a single push-button would illuminate the bubble vial levels via a battery power source, thus allowing the pilot to determine if the aircraft was banked left or right or was going in straight flight. This device would be adhered to the flight instrument cluster directly in front of the pilot and positioned in a horizontal manner for use as a back-up attitude reference at any time.

There has thus been outlined, rather broadly, the more important features of the invention in order that the detailed description thereof that follows may be better understood and in order that the present contribution to the art may be better appreciated.

The invention may also be strategically placed in the dash of the plane in view of the pilot as opposed to being adhered to the flight instrument cluster. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illuminated spirit level that has all of the advantages of the prior art spirit levels and none of the disadvantages.

It is another object of the present invention to provide a new and improved illuminated spirit level that may be easily and efficiently manufactured and marketed.

An even further object of the present invention is to provide a new and improved illuminated spirit level that has a low cost of manufacture with regard to both materials and labor, and which accordingly is then susceptible of low prices of sale to the consuming public, thereby making such illuminated spirit level economically available to the buying public.

Still another object of the present invention is to provide a new illuminated spirit level that provides in the apparatuses and methods of the prior art some of the advantages thereof, while simultaneously overcoming some of the disadvantages normally associated therewith.

Even still another object of the present invention is to provide an illuminated spirit level for determining aircraft attitude. This invention can be fastened to the dash of a plane in plain view of the pilot and can be used in the event that the electrical flight controls fail. The present invention uses a particular configuration of basic bubble vials in order to determine the orientation of the aircraft in the "X" and "Z" axes. This invention employs self-contained illumination features via luminescent fluids or battery-operated lighting devices. These devices allow this basic flight instrument to be read in the dark without the need for additional lights.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top plan view of the preferred embodiment of the illuminated spirit level constructed in accordance with the principles of the present invention showing the electrical lighting system in dashed outline.

FIG. 2 is a side elevational view of the spirit level of the present invention showing the electrical push button and housing.

FIG. 3 is a bottom plan view of the illuminated spirit level of the present invention showing placement of the adjusting means.

The same reference numerals refer to the same parts throughout the various figures.

DESCRIPTION OF THE PREFERRED EMBODIMENT

Referring now to the drawings, and particularly to FIGS. 1–3, a preferred embodiment of the spirit level of the present invention is shown and generally designated by the reference numeral 10.

In FIG. 1, a new and improved illuminated spirit level 10 of the present invention for determining aircraft attitude is illustrated and will be described. More particularly, the illuminated spirit level 10 is disposed in a cross-shape wherein there is a central level with a forward portion 12 and a rear portion 14. Connected at the juncture where the forward portion 12 and the rear portion 14 meet are a first arm portion 16, and a second arm portion 18 which extend outwardly from the central level at opposite 90 degree angles. The forward central portion 12, the first arm portion 16, and the second arm portion 18 all have at least one aperture, each of which contain a single bubble vial 20 which holds a leveling bubble and viscous fluid to which chemicals have been added which make it glow in the dark. As is well known in the art, the location of the bubble will indicate the level of the surface upon which the spirit level is placed. Each aperture is enclosed by a transparent material such as plastic, glass, or similar material to provide a secure, waterproof enclosure. The rear central portion 14 has at its end a push button 22 encased in a housing means 24. The push button 22 is connected internally to a battery 26, which is connected via conductor wires 28 to an illuminating means, which illuminates the plurality of bubble vials 20. The illumination means can be comprised of a battery 26 connected by conductor wires 28 to a single light bulb 40 placed within the center cavity of the central level to illuminate the bubble vials 20. Alternatively, the illumination means can be comprised of a battery 26 connected by conductor wires 28 to individual lamps containing bulbs placed within each aperture containing the bubble vials 20. In both instances, the push button 22 would be connected to the battery 26 so that when the push button 22 is depressed, it maintains a current flow from the battery 26 to the bulbs along the conductor wires 28. When the push button 22 is not depressed, the current flow from the battery 26 to the bulbs along the conductor wires 28 is interrupted. The push button 22 and its housing means 24 can be made of either a metal or a plastic. The spirit level 10 can be made of a plastic, metal or any other easily formed suitable material. The spirit level 10 may also have a compass 38 to provide a visual indication of direction.

FIG. 2 illustrates the adjusting means 30, which is used to calibrate the level 10. The adjusting means 30 can be lowered or raised to calibrate the spirit level. One adjusting means 30 is placed at each of the ends of the forward portion 12, rear portion 14, first arm portion 16, and second arm portion 18. The adjusting means 30 can be made of a metal such as steel, a chromium alloy, or any other suitable substance. It could alternatively be made of a heavyweight plastic. The adjusting means 30 is comprised of a flat circular end portion 32 attached to a middle threaded portion 34 that can be screwed into a base portion 36 so as to raise or lower the level 10 for calibration.

FIG. 3 is a bottom view of the level 10 illustrating the placement of the adjusting means 30 on the forward portion 12, rear portion 14, first arm 16, and second arm 18.

In use, it can now be understood that the present invention can be used to determine aircraft attitude and direction through the use of bubble vials 20 that are illuminated. It will allow the pilot to see if the aircraft is ascending, descending, or banking left or right. This invention could be mounted within the dash of the plane or it could be fastened above the instrument control panel in plain view of the pilot. This invention is particularly useful if the electrical system in the plane malfunctions and the pilot is unable to use the plane's altimeter since the levels can be seen in the dark via the battery 26 or the glow-in-the-dark fluid.

While a preferred embodiment of the illuminated spirit level has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spirit level comprising:
   an elongated main frame having a center cavity and a forward and a rear portion wherein said forward portion contains an aperture into which a bubble vial is positioned;
   first and second arms having opposing ends said arms having one end connected to said main frame at the juncture created where said forward and said rear portions connect, and said opposing end of said arms projecting in opposite directions therefrom at 90 degree angles;
   said opposing end of said first and second arms each having an aperture into which a bubble vial is positioned;
   said bubble vials are enclosed by a transparent, waterproof, impact resistant material;
   said rear portion of said main frame containing a battery connected by conductor wires to an illuminating means;
   a plurality of adjusting means attached to the bottom ends of said main frame and said first and second arms; and
   securing means for attaching the level to the dashboard of an aircraft.

2. The spirit level of claim 1, wherein said bubble vials are filled with a fluid that glows in the dark.

3. The spirit level of claim 1, wherein said illuminating means comprises a light bulb, a battery, conductor wires, and a push button switch.

4. The spirit level of claim 3, wherein said light bulb is located within the center cavity of said main frame.

5. The spirit level of claim 3, wherein said push button switch is encased in a housing and maintains a current flow from said battery to said light bulb along said conductor wires when said push button is depressed and further interrupting current flow from said battery to said light bulb along said conductor wires when said push button is not depressed.

6. The spirit level of claim 1, wherein said adjusting means comprises a circular flat end portion, a threaded portion, and a base portion.

7. The spirit level of claim 6, wherein said circular flat end portion is connected to said threaded portion on one end and is in contact with a flat surface on the opposite end.

8. The spirit level of claim 6, wherein said threaded portion can be screwed into said base portion to calibrate said spirit level.

9. The spirit level of claim 1, wherein said spirit level is manufactured of a material selected from the set of metal and plastic.

10. A spirit level comprising:
    an elongated main frame having a forward and a rear portion wherein said forward portion contains an aperture into which a bubble vial is positioned;
    first and second arms having opposing ends with one end of said arms being connected to said main frame at the juncture created where said forward and said rear portions connect, and said opposing end of said arms projecting in opposite directions therefrom at 90 degree angles;
    said opposing end of said first and second arms each having an aperture into which a bubble vial is positioned;
    said bubble vials enclosed by a transparent, waterproof, impact resistant material;
    said rear portion of said main frame containing a battery connected by conductor wires to an illuminating means;
    a plurality of adjusting means attached to the bottom ends of said main frame and said first and second arms; and
    securing means for attaching the level to the dashboard of an aircraft.

11. The spirit level of claim 10, wherein said bubble vials are filled with a fluid that glows in the dark.

12. The spirit level of claim 10, wherein said illuminating means comprises lamps, a system of conductor wires, a battery, and a push button switch.

13. The spirit level of claim 12, wherein at least one illuminating lamp is located per aperture, said lamps each having a base fixed inside said main frame and said first and second arms and a bulb extending into the corresponding aperture to provide light therein.

14. The spirit level of claim 12, wherein said push button switch is encased in a housing means located at the end of said rear portion and maintains a current flow from said battery to said bulbs along said conductor wires when said push button is depressed and further interrupting current flow from said battery to said bulbs along said conductor wires when said push button is not depressed.

15. The spirit level of claim 10, wherein said adjusting means comprises a circular flat end portion, a threaded portion, and a base portion.

16. The spirit level of claim 15, wherein said circular flat end portion is connected to said threaded portion on one end and is in contact with a flat surface on the opposite end.

17. The spirit level of claim 15, wherein said threaded portion can be screwed into said base portion to calibrate said spirit level.

18. The spirit level of claim 10, wherein said spirit level is manufactured of a material selected from the set of metal and plastic.

19. A spirit level comprising:
    an elongated main frame, manufactured of metal or plastic, having a forward and a rear portion wherein said forward portion contains an aperture into which a bubble vial, containing a fluid that glows in the dark, is positioned and said rear portion contains a push-button switch at its end which is encased in a housing means;
    first and second arms having opposing ends, manufactured of metal or plastic, with one end of said arms being connected to said main frame at the juncture created where said forward and said rear portions connect, and said opposing end of said arms projecting in opposite directions therefrom at 90 degree angles;

said opposing end of said first and second arms each having an aperture into which a bubble vial, containing a fluid that glows in the dark, is positioned;

said bubble vials enclosed by a transparent, waterproof, impact resistant material;

at least one illuminating lamp per aperture, said lamps each having a base fixed inside said main frame and said first and second arms and a bulb extending into the corresponding aperture to provide light therein;

a power source comprising a battery, which is located in said rear portion of said main frame;

conductor wires providing electrical communication between said battery and said lamps;

a contact push button switch, which maintains a current flow from said battery to said bulbs along said conductor wires when said push button is depressed and further interrupting current flow from said battery to said bulbs along said conductor wires when said push button is not depressed;

a plurality of adjusting means, comprising a circular flat end portion connected to a threaded portion that can be screwed into a portion, said adjusting means attached to the bottom end of said main frame and the bottom ends of said first and second arms; and securing means for attaching the level to the dashboard of an aircraft.

* * * * *